Figure 5:
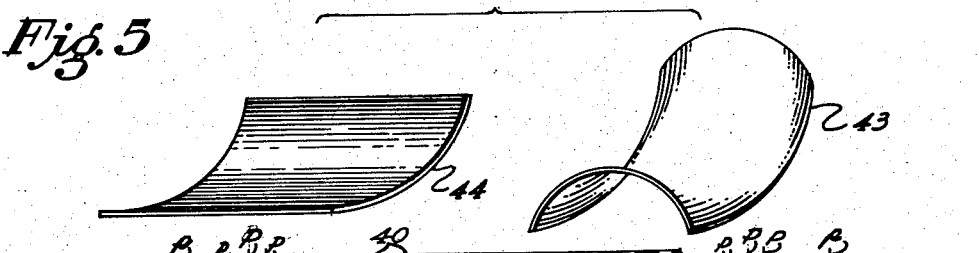

Nov. 11, 1958  D. W. KRAYBILL  2,859,719
COMBINED RESILIENT PRESS PAD AND EXPANDABLE BLADDER
Filed Aug. 17, 1953  3 Sheets-Sheet 1
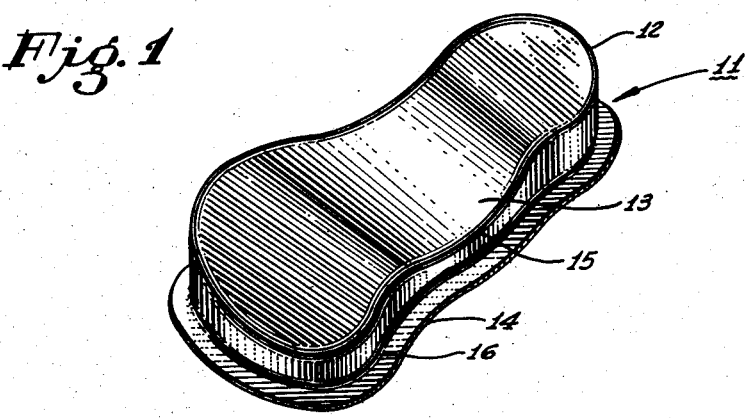
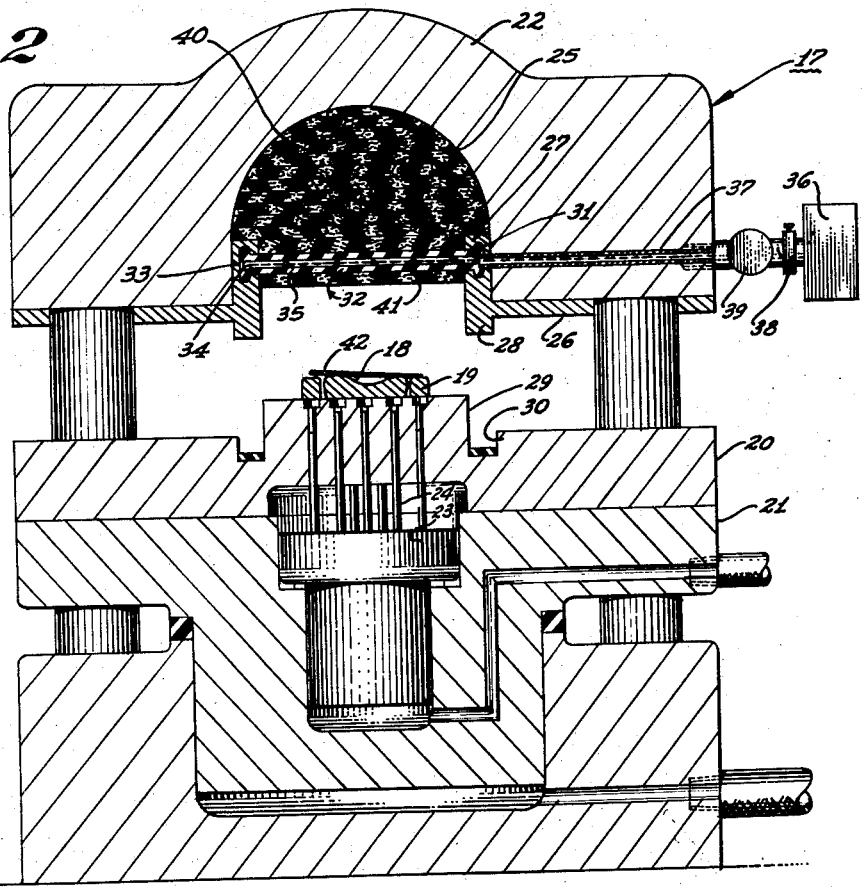
INVENTOR:
Daniel W. Kraybill
By Herbert E. Metcalf
His Patent Attorneys

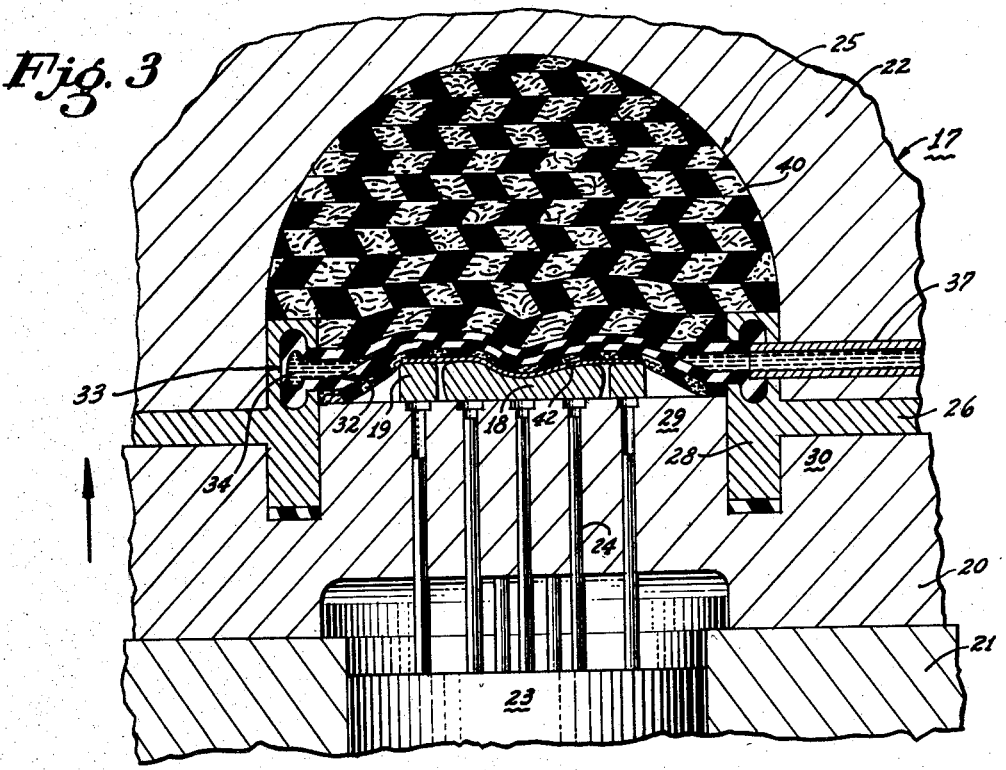
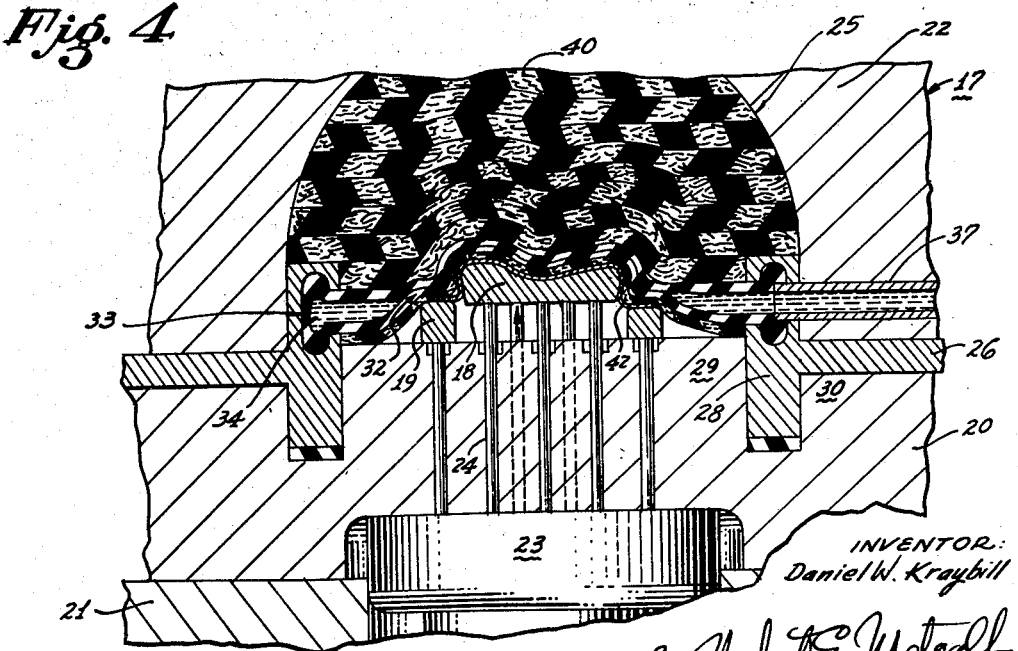

United States Patent Office 2,859,719
Patented Nov. 11, 1958

2,859,719

COMBINED RESILIENT PRESS PAD AND EXPANDABLE BLADDER

Daniel W. Kraybill, Downey, Calif., assignor to Northrop Aircraft, Inc., Hawthorne, Calif., a corporation of California Application August 17, 1953, Serial No. 374,516

2 Claims. (Cl. 113—44)

This invention relates to apparatus for forming ductile sheet material and more particularly to apparatus for forming sheet metal parts by a drawing operation.

The expeditious and economical fabrication (drawing) of complex sheet metal parts, conforming with ever increasing standards, presents a difficult as well as a challenging problem. These problems are present wherever sheet metal parts are formed by a drawing process and particularly in the aircraft industry where large quantities of complex sheet metal parts must be produced economically within a short period of time. Various methods and types of apparatus have been proposed and utilized in forming such parts, however, these prior art devices have certain deficiencies which are overcome by the apparatus disclosed herein.

Briefly the instant invention may embrace, in one simultaneous operation, a deep draw, a rubber forming operation, and an operation in which a blank is subjected to fluid pressure, this combination of operations resulting in an accurately well formed part. This combined operation is achieved by positioning the blank between a movable forming die and an expandable bladder facility adapted to receive fluid under pressure, the bladder being backed on its side opposite the blank by a pliable forming facility. During the forming operation various combinations of forces may be made effective to form the part as shown in the accompanying drawings and presently explained.

An object of the instant invention is to disclose suitable apparatus for forming ductile sheet material into various shapes by a drawing operation in which optimum distribution, as well as the most efficient application, of the forming forces are utilized.

Another object is to disclose suitable apparatus for forming ductile sheet material into various shapes by a drawing operation in which the lines of force occurring during the operation are selectively controlled, especially during the draw or stretch phase of the operation.

Another object is to provide apparatus, for forming ductile sheet material into various shapes, which is not limited to one particular type of forming operation.

Another object is to provide apparatus, for forming ductile sheet material into various shapes by a drawing operation, which does not require a female die or specially matched surfaces.

Another object is to provide apparatus, for forming ductile sheet material into various shapes by a drawing operation, which is simple and compact in design and construction, economical to manufacture, and flexibly adapted to various drawing operations.

These and other objects will become more apparent from the following description and drawings in which like reference characters denote like parts throughout the several views. It is to be expressly understood, however, that the drawings are for the purpose of illustration only and not a definition of the limits of the invention, reference being had for this purpose to the appended claims.

In the drawings:

Figure 1 shows a typical sheet metal part formed by the apparatus and processes disclosed herein.

Figures 2 to 4, incl., show a preferred embodiment of apparatus and illustrate the basic steps involved in forming the part shown in Figure 1.

Figure 5 shows a typical sheet metal fillet, formed by the apparatus and processes disclosed herein, and a preformed sheet from which the fillet may be shaped.

Figure 6:
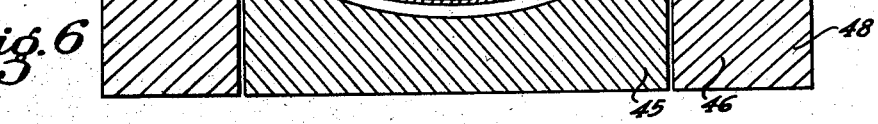
Figure 7:
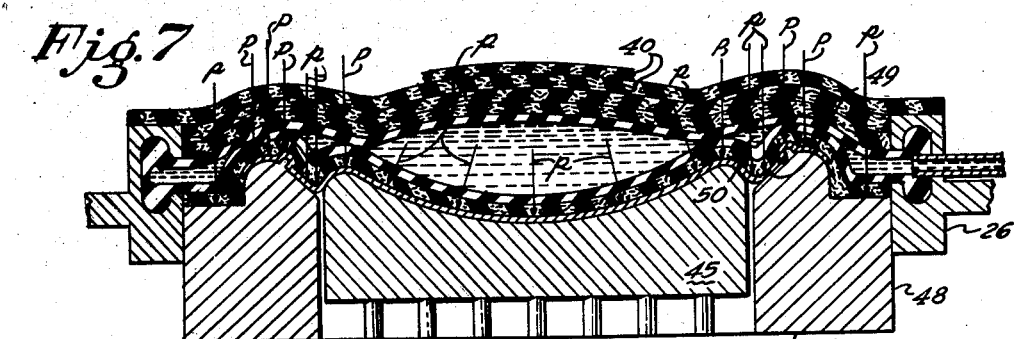
Figure 8:
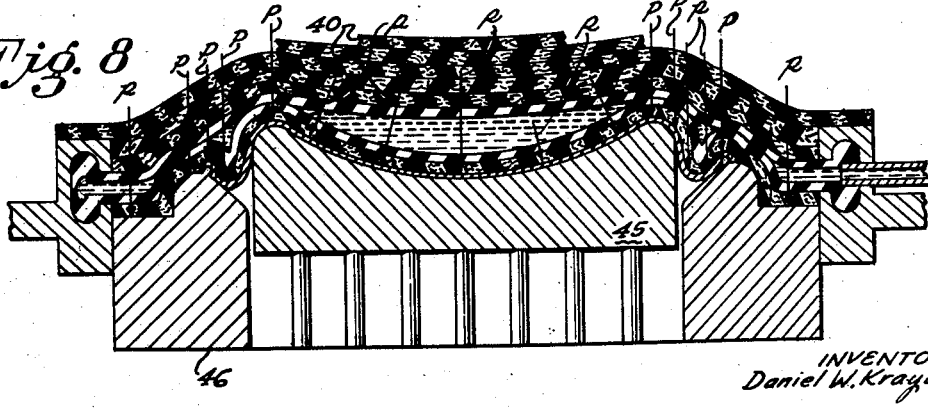

Figures 6 to 8, incl., show preferred apparatus and illustrate the basic steps involved in forming the fillet shown in Figure 5.

Referring to the drawing for a detailed description of the present invention, Figure 1 shows a typical sheet metal part 11 having characteristics which render the part difficult to form accurately in a single cycle operation by methods and apparatus currently known. The part 11 has a configuration which includes a deep drawn portion 12 having an indentation 13 in one of its surfaces and a flange portion 14. Generally cylindrical portions 15 and 16, of small curvature, occur between the flat surfaces and upstanding portion 12 and between the deep drawn and flange portions, respectively, of the part 11. The cylindrical portions 15 and 16 may be referred to as corners, the portions 15 are referred to throughout this specification as "outside corners" and portions 16 as "inside corners." The apparatus of the instant invention provides novel forming facilities whereby the part 11 may be formed in a single cycle operation.

Referring now to Figures 2 to 4, incl., a press 17 is shown in connection with which the forming facilities disclosed herein are mounted in an operational position. The press will not be described in detail as its construction and operation is well known to those skilled in the art. Briefly a forming die 18 and pressure ring 19, relatively positioned with respect to each other, are positioned on a die holding member 20 which in turn is carried by a movable platen 21. The platen 21, member 20, ring 19, and die 18 may be moved as a unit, by conventional means, in a vertical direction toward an upper stationary platen 22. Forming die 18 may also be moved in a vertical direction independently of the ring 19, member 20, and platen 21, this independent movement is made possible in a conventional manner by means of a pressure pad 23 and risers 24. Located in the upper platen 22 is a generally dome shaped cavity 25, its location permits the die 18 and pressure ring 19 to enter this cavity at such time as the die and ring are moved sufficiently in a vertical direction. Secured to the lower horizontal surface of platen 22 is a retainer element 26 having annular upstanding and depending portions 27 and 28, respectively. With the retainer element in position, that is on the lower surface of platen 22, the upstanding portion 27 extends into cavity 25 a suitable distance, the outside surface of portion 27 snugly fitting into a cylindrical wall portion of cavity 25. The inside and outside diameters of the depending portion 28 are such that this portion surrounds an upstanding cylindrical portion 29 and mates with a groove 30, both formed in member 20, at such time as platen 21 is moved sufficiently in a vertical direction. Formed in the wall of upstanding portion 27 of element 26 is an annular groove 31 which is generally T-shaped in cross-section. With element 26 in position on platen 22 the leg portion of groove 31 lies in a horizontal plane and continuously extends through the inner cylindrical surface of the upstanding portion 27 of the retaining element to provide an annular opening.

Completely closing the cavity 25 is a disk-like expandable bladder 32. The bladder retains itself in a horizontal position by means of its peripheral portion 33 which is T-shaped in cross-section, the peripheral portion mating with and completely filling groove 31. The peripheral portion 33 is provided with an annular passageway 34 communicating with the interior of the bladder through a plurality of circumferentially spaced apertures 35. The passageway 34 and accordingly the interior of the bladder is adapted to communicate with a source of hydraulic fluid 36 through a passageway 37 and conduit 38. Valve means 39, either manually or automatically operated, located in conduit 38 provides means whereby a certain amount of fluid may be locked in the bladder during a forming operation. The bladder may be constructed of any suitable elastic material capable of withstanding pressures to which it may be subjected and also retain its elasticity so it will return to its normal position, as shown in Figure 2, after each forming operation. The bladder may be constructed of an elastic material such as rubber.

The bladder may also be constructed with a plurality of radial passageways in its upper wall, each of these passageways communicating with the passageway 34 and the interior of the bladder through a plurality of radially spaced apertures located throughout the length of each radial passageway.

Positioned within and completely filling the cavity 25 above bladder 32 is a plurality of juxtaposed rubber sheets 40, each sheet being placed in a horizontal position with the lowermost sheet contacting the upper surface of the bladder. These sheets provide a resilient backing for the bladder 32 and function to provide certain desirable forces during a forming operation. A sheet of rubber 41, positioned on the lower surface of the bladder, serves as a protecting covering for the lower surface thereof.

With the apparatus of the instant invention thus generally described the cooperation of its various parts and the forces made available will become more apparent from the following discussion in which the forming of a sheet metal part is described.

Assuming the sheet metal part 11, shown in Figure 1, is to be formed from a blank 42 of suitable pre-cut sheet material. At the beginning of a forming operation the blank is positioned substantially as shown in Figure 2, in this position the blank completely covers the die 18 and extends a suitable distance over the ring 19.

With the sheet metal blank in position, the lower platen 21 is raised sufficiently so that the depending portion 28 of the retainer ring contacts upstanding portion 29 of the die holding member, thereby sealing the rubber sheets 40 and 41 and bladder 32 in the cavity 25. This initial movement of the component parts sets the blank against the pressure ring 19 and prepares the metal and pliable forming facility to receive the die 18. At this time one versatile feature of the apparatus may be pointed out. Prior to the aforementioned initial move of the lower platen, fluid at a given pressure may be locked in the bladder 32 or it may be completely free of fluid as required by the operation to be performed, in the latter instance the walls of the bladder merely constitute two more rubber laminations, however, the bladder remains in position and is available to receive hydraulic fluid during a later phase of the forming operation if desired.

The holding pressure, that is the pressure holding the blank 42 on the pressure ring 19, is extremely important during a drawing operation of the formation of wrinkles due to circumferential compressive stresses are to be avoided. For example, if the blank is relatively thin compared with its longitudinal and lateral dimensions, the holding pressure is likely to vary up to about one-third of the drawing pressure. If the drawn shape is very shallow, the metal must be stretched beyond its elastic limit in order to hold its shape, making it necessary to use higher blank-holding loads. These extremely critical blank-holding and forming pressures may be accurately regulated as desired with the instant apparatus. With the bladder free of fluid the ring 19 may be moved upwardly, against the force exerted by the compressed sheets 40, until the exact amount of blank-holding pressure is exerted. This result could not be accomplished if the ring 19 was pushed against a diaphragm backed only by a hydraulic fluid without distributing forces over the entire surface of the blank, this latter procedure might result in an undesirable preforming of the blank. Should the blank become preformed in an undesirable manner, prior to the time it is contacted by forming die 18, work hardening factors will unquestionably result which may cause it to fracture later in the forming operation. On the other hand if the nature of the part being formed requires the even distribution of forces over its entire surface fluid may be locked in the bladder prior to the start of a forming operation, this results in the application of controlled pressures evenly distributed over the entire surface of the blank allowing deeper draws and uniform thickness of the finished part.

With the proper blank-holding forces exerted on the blank the drawing operation may be executed, various parts of the apparatus assuming positions as shown in Figure 4. In this operation the die 18 is raised independently of ring 19 by means of pressure pad 23 and risers 24. This operation may be performed without any fluid in the bladder 32, a given amount of fluid may be locked in the bladder, or fluid pressure in the bladder may be increased in either case and decreased in the latter case accordingly as conditions demand. Under conditions in which no fluid pressure is present in the bladder the drawing procedure will compare with conventional deep draw rubber processes. Also the deep draw facility, of the present apparatus, may be made inoperative with the die 18 locked in its raised position as shown in Figure 4, this illustrates by comparison the complete lack of any deep draw forming facility in other bag processes. It is apparent that the present apparatus embodies both of the above features, that is a deep draw rubber process and an expanding bag process, either of which or their combination may be used during each operation.

It is apparent the rubber sheets 40 exert the majority of their forces in a vertical direction, particularly during the initial phase of the drawing operation. The expanding bladder through its hydraulic fluid pressurizing facility exerts additional forming forces which are fully controlled and evenly distributed on the blank 42 and subsequently the part 11 during the complete drawing operation. These additional forming forces are equally effective in all directions and are far more effective in horizontal directions than the forces exerted by the rubber lamina alone when used in deep draw processes. The ductility of the confined hydraulic fluid evenly distributes the forming pressure over the entire surface of the metal, it is particularly useful in preventing the formation of scallops, wrinkles, or the loose flow of metal around a curved surface. It is this fluid pressure which materially aids in the proper formation of the inside corners 16 while the outside corners 15 are simultaneously being formed by concentrated forces exerted by the compressed lamina 40. These latter forces due to the compressed lamina exerted at specific points during the drawing process, e. g., at the outside corners 15, are not present in the same degree as processes utilizing fluid pressure only.

Upon completion of the drawing operation component parts of the forming apparatus are moved to the relative position as shown in Figure 2. The completed part 11 may now be removed and the forming operation repeated using a new blank.

A more complete understanding of the present process and apparatus, combining forces exerted by the rubber lamina 40 and fluid confined within bladder 32, will be forthcoming by referring to Figures 5 to 8, inclusive. Here various steps in the forming of a fillet 43 are shown, the fillet being formed from a pre-shaped blank 44. A fillet of this type, due to its complexity of compound contours, is one of the most difficult shapes to form satisfactorily with existing forming facilities. Such fillets are currently formed on a drop hammer or comparable device involving a progression of separate starter, intermediate, and finishing operations involving stretch, shrink, and draw forming, all of which are expensive and time consuming.

The forming of the fillet 43 is accomplished in one continuous and uninterrupted cycle by apparatus as shown in the accompanying figures. The same type of apparatus is used in forming the subject fillet as that previously described and shown in Figures 2 to 4, incl., except the die 45 conforms to the shape of the fillet 43 and the pressure ring 46 is also reshaped. The ring 46 is provided with a bead 47 which materially aids in properly holding the blank 44 during the drawing operation.

Referring first to Figure 6, the lower platen of the press has been raised to engage ring extension 48 and lamina retaining element 26. This position sets the blank against the pressure ring and bead and prepares the metal and pliable forming facility to receive the die. The ductility of the confined hydraulic fluid, within bladder 32, makes it possible to evenly distribute the forming pressure over the entire surface of the blank 44 without exerting too much pressure at the ring 46 before the die is engaged. At this point or stage of forming in other processes utilizing only forces exerted by compressed rubber a progressively increasing pressure is built up on the pressure ring. In these processes, utilizing only compressed rubber, as the lower platen continues to rise, forcing the pressure ring a greater distance into the rubber lamina the sheet metal being formed may fracture before the pressure on the sheet metal blank is equalized by the form die acting on the under surface of the blank. In other words in the latter processes vertical pressures acting on the ring 46 and bead 47 may become excessive and preclude efficient flow of the blank 44 and relative movement between the ring 46 and blank 44. If such excessive pressures do occur the aforementioned rupture of the blank 44 may occur before the rubber lamina becomes effective to urge the blank 44 into contacting relation with the die 18.

On the other hand if additional blank-holding pressure is required the ring 46 may be moved further into the rubber lamina. This movement will further compress the lamina 40 locally above ring 46 and increase the pressure at this point as indicated by the arrows P. The remaining forming pressure, exerted by the confined hydraulic fluid, will continue to be evenly distributed over the entire surface of blank 44 as indicated by the arrows p.

In Figure 7 the die 45 has been raised with respect to ring 46 and illustrates how the die engages the sheet metal without building up excessive forming pressures at any point of contact of the blank 44 with die 45 or ring 46. Here it will be noted that the pressure P, exerted primarily by the rubber lamina, has caused the blank to contour to the upper surface of ring 46 and bead 47. At the same time the pressure p remains evenly distributed over the contoured face of the blank, at the re-entry portion 49 occurring between the ring 46 and forming die 45, and at the vertical outside edges of the pressure ring. The body of hydraulic fluid 50, trapped above the aforementioned re-entry portion, exerts its pressure evenly in all direction, it is clear that an even distribution of pressure would not occur at this point if the compressive forces of the rubber lamina 40 only were utilized.

In Figure 8 the die 45 has been raised still further to complete the drawing operation. Here again it is apparent evenly distributed forming forces p are present which are conductive of excellent stretch, shrink, and draw forming. The equal pressurizing of both sides of the blank with uniformly distributed pressure does not subject the metal to accumulated stresses or concentrated strain regardless of the depth of the draw. The blank will not fracture under these conditions until the combined total of the metal elongation factor has been reached, therefore the point at which the metal blank will pass its yield point is considerably extended.

Accordingly it is seen novel process of drawing sheet metal parts is disclosed together with apparatus for putting these processes in operation. The above processes make possible the use of a forming die conforming to the finished shape and its accurate forming ability. An outstanding feature in the utilization of these processes lie in their ability to fabricate sheet metal shapes meeting the ever increasing standards continually being set for the interchangeability and replacement of parts.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. Apparatus for executing a forming operation on ductile sheet material comprising: a support structure; a die holding member mounted on said structure for bi-directional movement thereon; said member includes an outer face adapted to receive a die and holding ring; first means mounted on said structure adapted to impart said bi-directional movement to said member; second means mounted on said structure adapted to impart independent bi-directional movement to said die and ring when mounted on said outer face and which movement is also independent of the movement of said member; a body of resilient material located in opposed and aligned relation with respect to said outer face; a disk-like expandable bladder adapted to receive liquid and which is positioned in contact with the surface of said body of resilient material which is most adjacent to said outer face; said first means adapted to move said member from a first to a second position in which said outer face is spaced from and is in contact with said bladder, respectively; means confining said body of resilient material in a chamber of substantially constant volume at such time as said outer face is in contact with said bladder; and means whereby a predetermined amount of fluid may be placed in said bladder and locked therein throughout a forming operation.

2. In a press of the type in which a female die is not required in the forming of sheet metal parts, the combination comprising: a platen member having a die engaging face; portions of said platen member define a cavity opening on said die engaging face; an expandable disk-like bladder secured in and completely closing the opening of said cavity; a body of resilient material completely filling the cavity defined by the walls thereof and said bladder; portions of said bladder define passage means whereby liquid may flow into and exit from said bladder; and conduit means including valve means connected to said passage whereby the flow of liquid to or from said bladder may be arrested.

References Cited in the file of this patent
UNITED STATES PATENTS

| | | |
|---|---|---|
| 1,468,706 | Harrison | Sept. 25, 1923 |
| 1,533,115 | Hulbert | Apr. 14, 1925 |
| 2,066,085 | Whistler | Dec. 29, 1936 |
| 2,344,743 | Smith | Mar. 21, 1944 |

(Other references on following page)

UNITED STATES PATENTS

| | | |
|---|---|---|
| 2,357,806 | Borkland | Sept. 12, 1944 |
| 2,375,599 | Walton | May 8, 1945 |
| 2,418,393 | Bridgens | Apr. 1, 1947 |
| 2,423,862 | Vorobik | July 15, 1947 |
| 2,565,949 | Clifford et al. | Aug. 28, 1951 |
| 2,741,205 | Paulton | Apr. 10, 1956 |
| 2,756,707 | Peters | July 31, 1956 |
| 2,783,728 | Hoffman | Mar. 5, 1957 |

FOREIGN PATENTS

| | | |
|---|---|---|
| 333,104 | Great Britain | Aug. 7, 1930 |
| 875,364 | France | June 22, 1942 |
| 488,409 | Canada | Nov. 25, 1952 |

OTHER REFERENCES

Rubber Press Pads; Prepared by Mechanical Goods Development Department of the Goodyear Tire and Rub-